United States Patent
Vaidyanathan et al.

(10) Patent No.: US 8,200,991 B2
(45) Date of Patent: *Jun. 12, 2012

(54) GENERATING A PWM LOAD PROFILE FOR A COMPUTER SYSTEM

(75) Inventors: Kalyanaraman Vaidyanathan, San Diego, CA (US); Kenny C. Gross, San Diego, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1069 days.

This patent is subject to a terminal disclaimer.

(21) Appl. No.: 12/117,993

(22) Filed: May 9, 2008

(65) Prior Publication Data

US 2009/0282230 A1 Nov. 12, 2009

(51) Int. Cl.
*G06F 1/26* (2006.01)

(52) U.S. Cl. .................. 713/300; 324/750.03; 702/117; 702/124

(58) Field of Classification Search ............. 324/750.03; 702/117, 124; 713/300
See application file for complete search history.

(56) References Cited

U.S. PATENT DOCUMENTS

| 7,849,332 B1 * | 12/2010 | Alben et al. .................. 713/300 |
| 7,925,873 B2 * | 4/2011 | Vaidyanathan et al. .......... 713/1 |
| 2008/0162965 A1 * | 7/2008 | Marinas et al. ............... 713/320 |

* cited by examiner

*Primary Examiner* — Albert Wang
(74) *Attorney, Agent, or Firm* — Park, Vaughan, Fleming & Dowler LLP

(57) ABSTRACT

Some embodiments of the present invention provide a system that generates a load for a computer system in accordance with a predetermined load profile. During operation, the load for the computer system is generated by modulating the load using pulse-width modulation, wherein the load is periodically cycled between at least two different test load levels so that a moving window average of the modulated load follows the predetermined load profile.

20 Claims, 2 Drawing Sheets

GENERATING A PWM LOAD PROFILE FOR A COMPUTER SYSTEM

BACKGROUND

1. Field

The present invention generally relates to techniques for characterizing a computer system. More specifically, the present invention relates to a method and an apparatus that generates a load for a computer system in accordance with a predetermined load profile.

2. Related Art

In order to plan for the power requirements of a data center, computer system users often desire to know how much power a computer system will use when running the user's load profile. However, in order to generate the load profile that will run on a computer system, the manufacturer may have to run the software stack that the computer user will run at the user's datacenter in order to faithfully reproduce the user's load profile. However, computer users may be reluctant to allow their business-sensitive software stack to be run on a computer system at the manufacturer's site in order to ascertain its performance. Therefore, without the ability to approximate the computer user's load profile, computer system manufacturers may specify a worst-case maximum power usage of their system which can lead to over-provisioning of power to data centers.

Additionally, during qualification testing of computer systems to assess their reliability, computer manufacturers often test computer systems or components in a thermal chamber by temperature cycling the chamber to determine if a failure occurs. However, the process of temperature cycling inside a chamber, in which the temperature is typically uniform, is not necessarily representative of the thermal stresses a computer system or component will experience during normal operation. During normal operation outside of a thermal chamber, temperature may not be uniform because thermal stresses and temperature gradients are created by the load profile. Thus, temperature cycling inside a chamber may not faithfully reproduce the stresses, and therefore failure modes, caused by load variations during normal operation.

Hence, what is needed is a method and an apparatus that generates a load for a computer system in accordance with a predetermined load profile.

SUMMARY

Some embodiments of the present invention provide a system that generates a load for a computer system in accordance with a predetermined load profile. The load for the computer system is generated by modulating the load using pulse-width modulation (PWM), wherein the load is periodically cycled between at least two different test load levels so that a moving window average of the modulated load follows the predetermined load profile.

In some embodiments, the predetermined load profile includes a load for a processor in the computer system.

In some embodiments, the predetermined load profile includes a load for an I/O system in the computer system.

Some embodiments further include using the predetermined load profile to exercise the computer system in a manner that generates a predetermined temperature profile in a component in the computer system.

In some embodiments, the predetermined load profile includes a sinusoid.

In some embodiments, the predetermined load profile includes a constant load.

Some embodiments generate a plurality of predetermined load profiles, wherein a superposition of predetermined load profiles in the plurality of predetermined load profiles approximates a target load profile.

In some embodiments, a predetermined load profile in the plurality of predetermined load profiles includes a sinusoid.

Some embodiments further include measuring a performance parameter of the computer system while executing the predetermined load profile on the computer system.

DETAILED DESCRIPTION

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present description. Thus, the present description is not intended to be limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Figure 1:
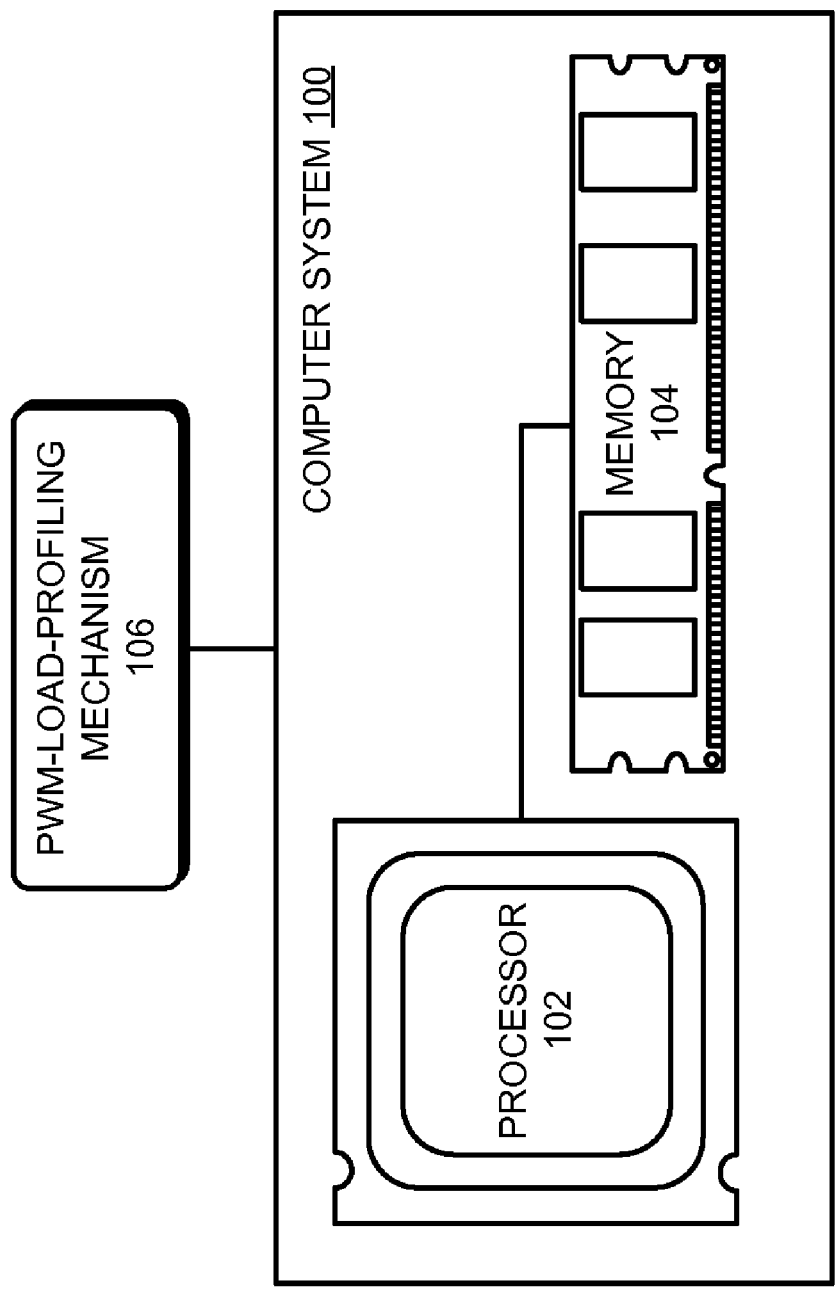
FIG. 1 illustrates a system that generates a load for a computer system in accordance with a predetermined load profile in agreement with some embodiments of the present invention.

FIG. 1 illustrates a system that generates a load for a computer system in accordance with a predetermined load profile in agreement with some embodiments of the present invention. Computer system 100 includes processor 102 coupled to memory 104. Additionally, PWM-load-profiling mechanism 106 is coupled to computer system 100.

Processor 102 can generally include any type of processor, including, but not limited to, a microprocessor, a mainframe computer, a digital signal processor, a personal organizer, a device controller, a computational engine within an appliance, and any other processor now known or later developed. Furthermore, processor 102 can include one or more cores.

Note that although FIG. 1 illustrates computer system 100 with one processor, computer system 100 can include more than one processor. In a multi-processor configuration, the processors can be located on a single system board, or multiple system boards. Computer system 100 can include but is not limited to a server, server blade, a datacenter server, or an enterprise computer.

Memory 104 can include any type of memory, including but not limited to, dynamic random access memory (DRAM), static random access memory (SRAM), flash memory, read only memory (ROM), and any other type of memory now known or later developed.

PWM-load-profiling mechanism 106 can be implemented in any combination of hardware and software. In some embodiments, PWM-load-profiling mechanism 106 operates on computer system 100. In other embodiments, PWM-load-profiling mechanism 106 operates on one or more service processors. In still other embodiments, PWM-load-profiling mechanism 106 is located inside of computer system 100. In yet other embodiments, PWM-load-profiling mechanism 106 operates on a separate computer system. In some embodiments, PWM-load-profiling mechanism 106 includes a method or apparatus for monitoring and recording computer system performance parameters as set forth in U.S. Pat. No. 7,020,802, entitled "Method and Apparatus for Monitoring and Recording Computer System Performance Parameters," by Kenny C. Gross and Larry G. Votta, Jr., issued on Mar. 28, 2006, which is hereby fully incorporated by reference.

In some embodiments, PWM-load-profiling mechanism 106 generates a pulse-width-modulated load in accordance with a predetermined load profile by pulse-width modulating a load. In some embodiments, the load is generated by a script that exercises all subsystems (such as CPU, memory, I/O and bus) of computer system 100, and PWM-load-profiling mechanism 106 modulates the load by switching the load between a stop state, in which the load is not run, and a run state, in which the load is run. In some embodiments, the load remains in memory 104 during both the stop and run states to reduce the latency when switching between states. In the stop state the load remains in a suspended mode in memory, while in the run state the PWM-load-profiling mechanism 106 causes the load to resume running. In some embodiments, the predetermined load profile is generated by a moving window average of the pulse-width-modulated load. It is noted that in some embodiments, some or all other processes on computer system 100 are suspended or shut down while PWM-load-profiling mechanism 106 is modulating the load.

In some embodiments, PWM-load-profiling mechanism 106 modulates the load by switching the load between two states of load, a low-load state and a high-load state, wherein the low-load and high-load states can have any value of load between no load and maximum load. In some of these embodiments PWM-load-profiling mechanism 106 generates a pulse-width-modulated load wherein the lowest load level of the pulse-width-modulated load is no lower than the low-load state and the highest load level of the pulse-width-modulated load is no higher than the high-load state.

In some embodiments, PWM-load-profiling mechanism 106 monitors the load on processor 102 and uses this information as feedback to pulse-width modulate the load to generate a pulse-width-modulated load in accordance with the predetermined load profile. In other embodiments, PWM-load-profiling mechanism 106 monitors a performance parameter of one or more components of computer system 100, including but not limited to one or more performance parameters disclosed in U.S. Pat. No. 7,020,802, entitled "Method and Apparatus for Monitoring and Recording Computer System Performance Parameters," by Kenny C. Gross and Larry G. Votta, Jr., issued on Mar. 28, 2006, and uses this information as feedback to pulse-width modulate the load in accordance with the predetermined load profile. PWM-load-profiling mechanism 106 can monitor a performance parameter from portions of computer system 100, which can include but are not limited to a processor, an I/O system, bus, or memory.

In some embodiments, the pulse-width-modulation frequency used to generate the pulse-width-modulated load in accordance with the predetermined load profile is selected to be equal to or faster than a predetermined frequency. In some embodiments, the predetermined frequency is selected based on parameters that include but are not limited to one or more of the following: a frequency of a processor in the computer system, a frequency of a bus in the computer system, a frequency of a cache refresh, a time period that a load or application remains resident in memory, a rate at which performance parameters are monitored, and a thermal diffusion rate for a component in the computer system. In some embodiments, the pulse-width-modulation frequency is changed during one or more segments of the pulse-width-modulated load.

In some embodiments, the width of the moving average window is a predetermined time period which is selected to be greater than time periods that include but are not limited to one or more of the following: a frequency of a processor in the computer system, a frequency of a bus in the computer system, a frequency of a cache refresh, a time period that a load or application remains resident in memory, a rate at which performance parameters are monitored, a thermal diffusion rate for a component in the computer system, and the modulation frequency used to generate the pulse-width-modulated load. In some embodiments, the predetermined time period is changed during one or more segments of the predetermined load profile.

In some embodiments, the predetermined load profile can include but is not limited to: a constant load, a sinusoid, a sinc function, a square wave, a rectangle wave, an impulse function, one or more functions of a complete set of functions, one or more functions of a complete orthogonal or bi-orthogonal set of functions, a predetermined target load profile, an approximation of a predetermined target load profile, or any other function capable of being generated using PWM in accordance with embodiments of this invention.

In some embodiments, PWM-load-profiling mechanism 106 is used to generate a predetermined performance parameter profile. For example, in some embodiments, a predetermined temperature profile for processor 102 is generated when PWM-load-profiling mechanism 106 modulates the load for processor 102 while monitoring the temperature of processor 102. Using feedback, PWM-load-profiling mechanism 106 pulse-width modulates the load in order to generate the predetermined temperature profile in processor 102. In some embodiments a predetermined load profile is used to generate the predetermined performance parameter profile. Moreover, in some embodiments components in computer system 100, including but not limited to processor 102, are temperature cycled using a predetermined function including but not limited to a square wave, a sinusoid, or an impulse function.

In some embodiments, PWM-load-profiling mechanism 106 generates a predetermined load in computer system 100, and then performance parameters of computer system 100 are measured. This process is continued for a plurality of predetermined loads, thereby generating a set of performance parameter results for each predetermined load. For example, in one embodiment, the plurality of predetermined loads includes sinusoidal loads of different frequencies. Note that a target load can then be approximated by constructing a Fourier series of predetermined loads in the plurality of predetermined loads. The behavior of the performance parameter monitored for the plurality of predetermined loads can then be used to synthesize the performance parameter behavior that would result from applying the target load profile to the computer system.

In some embodiments, the predetermined load profile is a sinusoid of a known frequency, and a performance parameter of the computer system is monitored at the known frequency as the predetermined load profile is executed.

Figure 2:
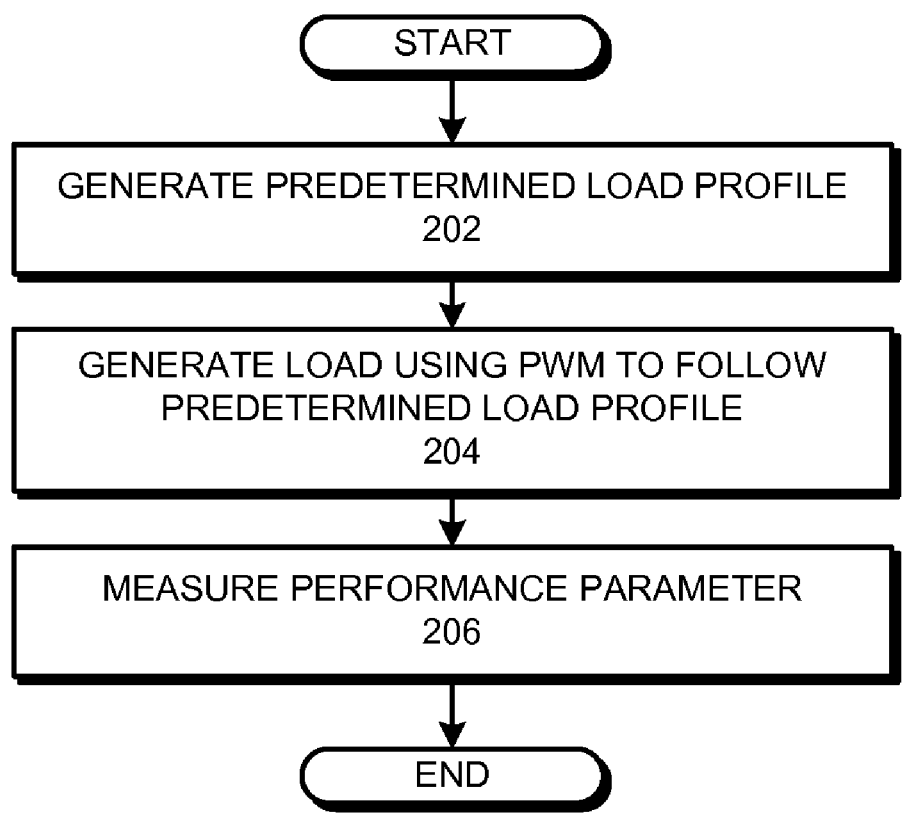
FIG. 2 presents a flowchart illustrating a process for generating a load for a computer system in accordance with a predetermined load profile in agreement with some embodiments of the present invention.

FIG. 2 presents a flowchart illustrating a process for generating a load for a computer system in accordance with a predetermined load profile in agreement with some embodiments of the present invention. First, a predetermined load profile is generated (step 202). Next, a load for a computer system is generated using PWM to follow the predetermined load profile (step 204). Then, if desired, a performance parameter of the computer system is measured (step 206).

In some embodiments, the load generated for the computer system using PWM in step 204 is generated by modulating the load between at least two different load levels. In some embodiments, the two different load levels include a low-load level and a high-load level wherein the low-load level is no load and the high-load level is a maximum-load level for the computer system. In other embodiments, the low-load level is greater than no load and the high-load level is less than the maximum-load level.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for generating a load for a computer system in accordance with a predetermined load profile, comprising:
generating the load for the computer system and in doing so modulating the load using pulse-width modulation, wherein the load is periodically cycled between at least two different test load levels, so that a moving window average of the modulated load follows the predetermined load profile.

2. The method of claim 1, wherein the predetermined load profile includes a load for a processor in the computer system.

3. The method of claim 1, wherein the predetermined load profile includes a load for an I/O system in the computer system.

4. The method of claim 1, further comprising:
using the predetermined load profile to exercise the computer system in a manner that generates a predetermined temperature profile in a component in the computer system.

5. The method of claim 1, wherein the predetermined load profile includes a sinusoid.

6. The method of claim 1, wherein the predetermined load profile includes a constant load.

7. The method of claim 1, further comprising:
generating a plurality of predetermined load profiles, wherein a superposition of predetermined load profiles in the plurality of predetermined load profiles approximates a target load profile.

8. The method of claim 7, wherein a predetermined load profile in the plurality of predetermined load profiles includes a sinusoid.

9. The method of claim 1, further comprising:
measuring a performance parameter of the computer system while executing the predetermined load profile on the computer system.

10. A non-transitory computer-readable storage medium storing instructions that when executed by a computer cause the computer to perform a method for generating a load for a computer system in accordance with a predetermined load profile, the method comprising:
generating the load for the computer system and in doing so modulating the load using pulse-width modulation, wherein the load is periodically cycled between at least two different test load levels, so that a moving window average of the modulated load follows the predetermined load profile.

11. The computer-readable storage medium of claim 10, wherein the predetermined load profile includes a load for a processor in the computer system.

12. The computer-readable storage medium of claim 10, wherein the predetermined load profile includes a load for an I/O system in the computer system.

13. The computer-readable storage medium of claim 10, further comprising:
using the predetermined load profile to exercise the computer system in a manner that generates a predetermined temperature profile in a component in the computer system.

14. The computer-readable storage medium of claim 10, wherein the predetermined load profile includes a sinusoid.

15. The computer-readable storage medium of claim 10, wherein the predetermined load profile includes a constant load.

16. The computer-readable storage medium of claim 10, further comprising:
generating a plurality of predetermined load profiles, wherein a superposition of predetermined load profiles in the plurality of predetermined load profiles approximates a target load profile.

17. The computer-readable storage medium of claim 10, further comprising:
measuring a performance parameter of the computer system while executing the predetermined load profile on the computer system.

18. An apparatus that generates a load for a computer system in accordance with a predetermined load profile, comprising:
a PWM-load-profiling mechanism configured to generate the load for the computer system and, while generating the load for the computer system, to modulate the load using pulse-width modulation;
wherein the load is periodically cycled between at least two different test load levels, so that a moving window average of the modulated load follows the predetermined load profile.

19. The apparatus of claim 18, wherein the PWM-load-profiling mechanism is further configured to measure a performance parameter of the computer system while executing the predetermined load profile on the computer system.

20. The apparatus of claim 18, wherein the PWM-load-profiling mechanism is further configured to generate a plurality of predetermined load profiles, wherein a superposition of predetermined load profiles in the plurality of predetermined load profiles approximates a target load profile.

* * * * *